US007038895B2

(12) United States Patent
Imai et al.

(10) Patent No.: US 7,038,895 B2
(45) Date of Patent: May 2, 2006

(54) APPARATUS FOR DETECTING ABNORMALITY OF RELAY

(75) Inventors: Fukami Imai, Kariya (JP); Hisaaki Wakao, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 254 days.

(21) Appl. No.: 10/284,139

(22) Filed: Oct. 31, 2002

(65) Prior Publication Data

US 2003/0080746 A1 May 1, 2003

(30) Foreign Application Priority Data

Oct. 31, 2001 (JP) ............................ 2001-334762

(51) Int. Cl.
*H02H 5/04* (2006.01)

(52) U.S. Cl. .......................................... 361/23; 361/29

(58) Field of Classification Search ............ 361/20–25, 361/179, 29; 324/418–424; 340/638, 644, 340/652, 654, 663; 307/137
See application file for complete search history.

(56) References Cited

U.S. PATENT DOCUMENTS 4,713,716 A * 12/1987 Takemura et al. ............ 361/2
4,821,604 A 4/1989 Asano
4,852,046 A * 7/1989 Jones et al. .................. 700/79
5,008,655 A * 4/1991 Schlesinger et al. ..... 340/691.4
5,227,729 A * 7/1993 Hoshino ..................... 324/423
5,455,733 A * 10/1995 Waggamon ................. 361/115
5,677,839 A * 10/1997 Kondo ........................ 701/29
5,895,989 A * 4/1999 Imaizumi et al. ........... 307/139
6,426,632 B1 * 7/2002 Clunn ........................ 324/509
6,683,778 B1 * 1/2004 Yugou ........................ 361/179

FOREIGN PATENT DOCUMENTS

DE 198 03 851 8/1999
EP 0 298 718 1/1989
EP 1 067 571 1/2001
JP 60-254530 12/1985

* cited by examiner

*Primary Examiner*—Brian Sircus
*Assistant Examiner*—Danny Nguyen
(74) *Attorney, Agent, or Firm*—Oblon, Spivak, McClelland, Maier & Neustadt, P.C.

(57) ABSTRACT

An abnormality detection apparatus, which reduces erroneous detection of an open abnormality of a relay, includes a microcomputer that activates the relay and determines whether the output voltage of the relay is less than a threshold value. When the output voltage is less than the threshold value, the microcomputer repeats the activation of the relay and the determination. The detection unit detects the occurrence of an open abnormality when the repetition number exceeds two.

16 Claims, 7 Drawing Sheets

APPARATUS FOR DETECTING ABNORMALITY OF RELAY

BACKGROUND OF THE INVENTION

The present invention relates to an apparatus for detecting an abnormality of a relay, and more particularly, to an apparatus for detecting an abnormality of a relay used in a controller of a drive force transmission.

A controller is used for a drive force transmission of a four wheel drive vehicle to activate and deactivate a relay that is incorporated or externally attached. The drive force transmission includes a clutch mechanism and an electromagnetic coil for connecting and disconnecting the clutch.

The controller activates the relay and controls the activation and de-activation of a switching transistor to control the amount of current supplied to the electromagnetic coil from a power supply via the relay. When the electromagnetic coil is excited, the clutch mechanism is connected and torque distribution is performed to achieve four wheel drive.

Such a controller determines whether the relay has an abnormality when an ignition switch (power supply switch) goes on. The detection of an abnormality of the ignition switch includes detecting whether a relay contact has fused (fusion detection) and detecting whether the relay has remained opened (open abnormality detection).

During open abnormality detection, the controller activates and deactivates the relay once to check the voltage of circuits connected to the relay and detect whether there is an open abnormality. When an open abnormality is detected, a fail safe process is immediately performed.

However, if there is a contact failure when the relay is activated and deactivated once and the contact returns to normal afterward, the controller erroneously detects a relay abnormality.

SUMMARY OF THE INVENTION

It is an object of the present invention to provide a relay abnormality detection device that reduces erroneous detections of a relay.

To achieve the above object, the present invention provides an apparatus for detecting whether an open abnormality has occurred in a relay when the relay is activated. The apparatus includes a detection unit for repeatedly activating the relay for a number of times and determining whether an output voltage of the relay is less than a first threshold value. The detection unit detects that an open abnormality has occurred in the relay when repeatedly determining that the output voltage is less than the first threshold value.

A further perspective of the present invention is an apparatus for detecting whether an open abnormality has occurred in a relay when the relay is activated. The apparatus includes a detection unit for activating the relay and determining whether an output voltage of the relay is less than a first threshold value. The detection unit repeats the activation of the relay and the determination when the output voltage of the relay is less than the first threshold value. The detection unit detects that an open abnormality has occurred in the relay when the number of repetition times exceeds a predetermined number.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
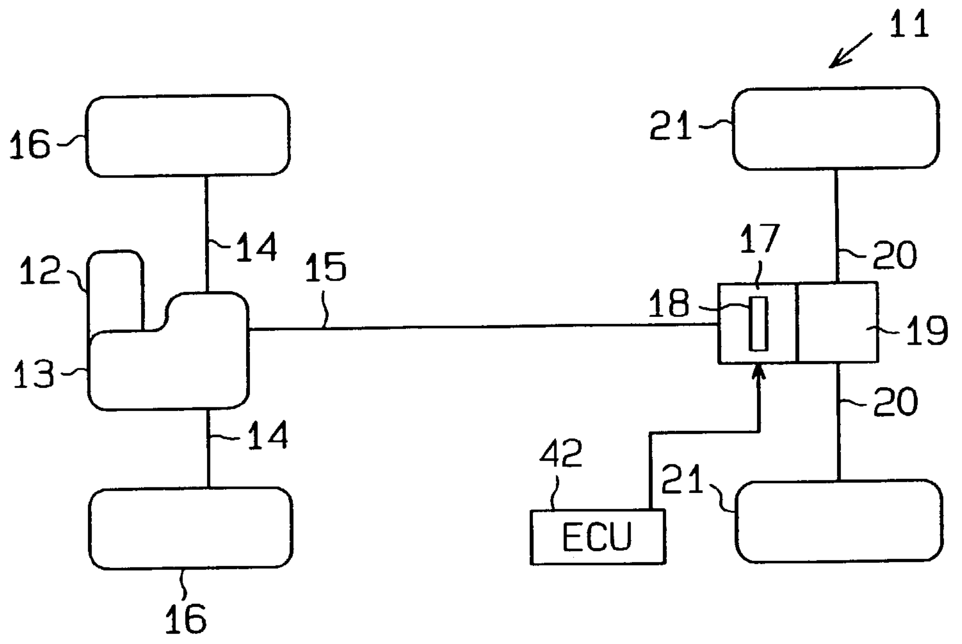
FIG. 1 is a schematic diagram of a four wheel drive vehicle.

In the drawings, like numerals are used for like elements throughout.

A drive force distribution controller 42 serving as a relay abnormality detection apparatus according to a preferred embodiment of the present invention will now be discussed with reference to the drawings. The drive force distribution controller 42 controls a drive force transmission 17, which is installed in a front wheel drive (FF) based four wheel drive vehicle.

Referring to FIG. 1, a four wheel drive vehicle 11 includes an internal combustion engine 12 and a transaxle 13. The transaxle 13 includes a transmission and a transfer (neither shown). Two front axles 14 and a propeller shaft 15 are connected to the transaxle 13. A front wheel 16 is mounted on each of the front axles 14. A drive force transmission (coupling) 17 is connected to the propeller shaft 15. A rear differential 19 is connected to the drive force transmission 17 by a drive pinion shaft (not shown). Two rear axles 20 are connected to the rear differential 19 with a rear wheel 21 connected to each rear axle 20.

The drive force of an engine 12 is transmitted to the two front wheels 16 by means of the transaxle 13 and the two front axles 14. When the drive force transmission 17 connects the propeller shaft 15 and the drive pinion shaft to enable torque transmission, the drive force of the engine 12 is transmitted to the two rear wheels 21 by means of the propeller shaft 15, the drive pinion shaft, the rear differential 19, and the two rear axles 20.

The drive force transmission 17 includes a wet multiplate electromagnetic clutch mechanism 18. The electromagnetic clutch mechanism 18 has a plurality of clutch plates (not shown) that frictionally engage one another in a selective manner. When an electromagnetic coil L0 (refer to FIG. 2), which is incorporated in the electromagnetic clutch mechanism 18, is supplied with current from the drive force distribution controller 42, the clutch plates frictionally engage one another to transmit torque to the rear wheels 21 and perform four wheel drive When the drive force distribution controller 42 stops the supply of current to the electromagnetic clutch mechanism 18, the clutch plates are separated from each other. This stops the transmission of torque to the rear wheels 21 and drives only the front wheels 16.

The frictional engaging force of each clutch plate increases and decreases in accordance with the amount of current supplied to the electromagnetic coil L0 of the electromagnetic clutch mechanism 18. This adjusts the torque transmitted to the rear wheels 21. That is, the restraining force applied to the rear wheels 21 (i.e., the frictional engaging force of the electromagnetic clutch mechanism 18) is adjusted in accordance with the current amount. Consequently, the drive force distribution controller 42 selects four wheel drive or two wheel drive and controls the drive force distribution rate (torque distribution rate) between the front and rear wheels 16, 21 when four wheel drive is performed.

Figure 2:
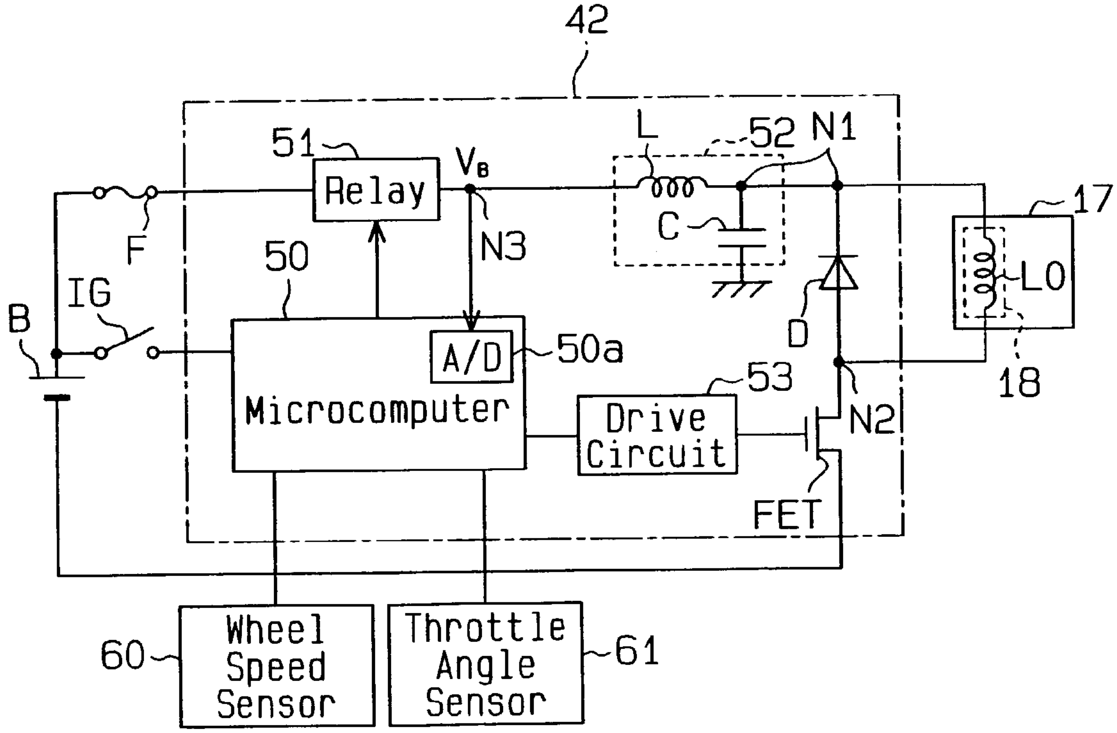
FIG. 2 is a schematic block diagram of a controller of a drive transmission in a four wheel drive vehicle according to a preferred embodiment of the present invention.

Referring to FIG. 2, the drive force distribution controller (4WD-ECU) 42 includes a microcomputer 50, which serves as a relay control unit, a relay 51, a noise elimination filter 52, and a drive circuit 53.

The microcomputer 50 includes a central processing unit (CPU, not shown), a random access memory (RAM), a read only memory (ROM), and an I/O interface. The ROM stores various types of control programs, which are executed by the drive force distribution controller 42, various types of data, and various types of maps. The maps are generated beforehand in accordance with the vehicle type from experimental results and known logic calculations. The RAM stores data that is required when the CPU executes control programs, including a relay abnormality detection program.

Wheel speed sensors 60 and a throttle angle sensor 61 are connected to the input of the microcomputer 50 (i.e., the input terminal of the I/O interface). An engine controller (not shown) is connected to the output of the drive force distribution controller 42 (i.e., the output terminal of the I/O interface) of the microcomputer 50.

Each of the wheels 16, 21 is provided with one of the wheel speed sensors 60 to detect the speed of the associated wheel (hereafter referred to as wheel speed). The throttle angle sensor 61 is connected to a throttle valve (not shown) to detect the angle of the throttle valve (i.e., the amount of an acceleration pedal that is depressed by a driver).

Based on detection signals from the sensors 60, 61, the microcomputer 50 determines whether the vehicle is being driven in a normal state and calculates a current command value.

A noise elimination filter 52 includes a coil L and a capacitor C. A battery B of the vehicle is connected to a series-connected circuit, which includes a fuse F, a relay 51, the coil L of the noise elimination filter 52, the electromagnetic coil L0, and a transistor FET. A node N1 between the coil L and the electromagnetic coil L0 is connected to the ground via the capacitor C. A fly wheel diode D is connected between the node N1, which is between the coil L and the electromagnetic coil L0, and a node N2, which is between the electromagnetic coil L0 and the transistor FET.

When an ignition switch IG, which is connected between the battery B and the microcomputer 50, goes on, the microcomputer 50 is supplied with the power of the battery B. When the microcomputer 50 is supplied with power, the microcomputer 50 executes various types of control programs. An A/D port 50*a* of the microcomputer 50 is connected to a node N3 between the relay 51 and the coil L. The microcomputer 50 detects the voltage at node N3 (i.e., power supply voltage VB (e.g. 14V) or relay output voltage) via the A/D port 50*a*.

The microcomputer 50 provides the drive circuit 53 with a current command value signal. To control the amount of current provided to the electromagnetic coil L0 in accordance with the current command value signal, the drive circuit 53 controls the activation and de-activation of the transistor FET (pulse width modulation (PWM) control). In this manner, the amount of current supplied to the electromagnetic coil L0 is controlled, and the distribution of drive force to the front and rear wheels is variably controlled.

The operation of the drive force distribution controller 42 will now be discussed. When the ignition switch IG goes on, the drive force distribution controller executes the relay abnormality detection program.

Figure 3:
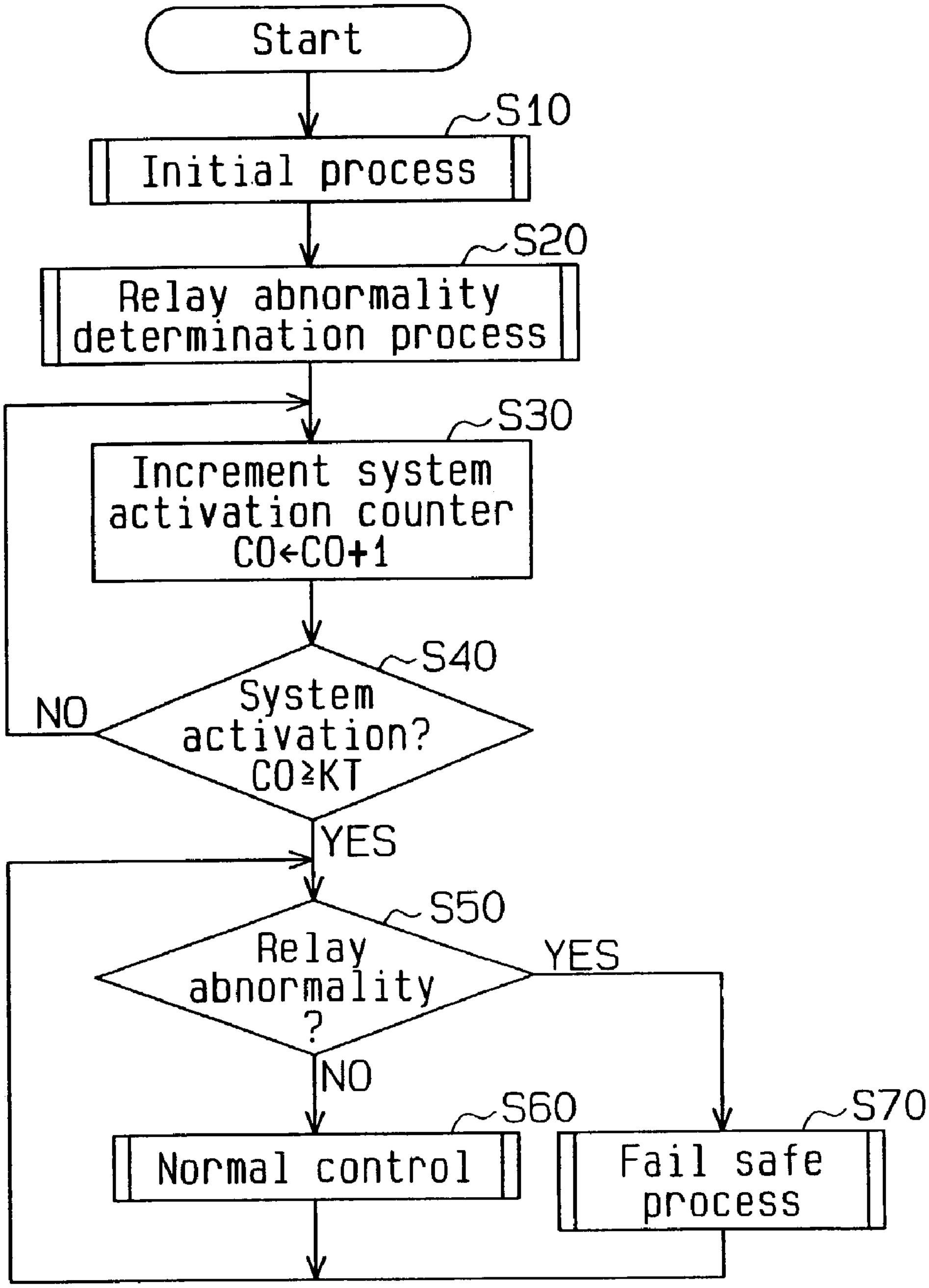
FIG. 3 is a flowchart illustrating an abnormality detection process performed by the controller of FIG. 2.

Referring to FIG. 3, in step S10 (steps will hereafter be represented by S), the microcomputer 50 performs initial processes, such as various types of computer initializations, a RAM check, a ROM check, and a register check.

Then, the microcomputer 50 performs a relay abnormality determination process (S20). The microcomputer 50 determines whether there is a relay abnormality. If it is determined that there is a relay abnormality, the microcomputer 50 sets a relay abnormality check flag to 1.

The microcomputer 50 increments a system activation counter (S30).

The microcomputer 50 determines whether a count value C0 of the system activation counter is greater than or equal to a predetermined value KT (S40). That is, the microcomputer 50 determines whether a predetermined time has elapsed.

When the count value C0 is greater than or equal to the predetermined value KT, the microcomputer 50 determines whether there is a relay abnormality, that is, whether the relay abnormality check flag is set at 1 (S50).

If the relay abnormality check flag is not set at 1, the microcomputer 50 performs normal control (S60). That is, based on the detection result of the sensors 60, 61, the microcomputer 50 selects four wheel drive or two wheel drive and controls the drive force distribution rate (torque distribution rate) between the front and rear wheels 16, 21 during four wheel drive.

If the relay abnormality check flag is set at 1, the microcomputer 50 performs a fail safe process (S70). That is, the microcomputer 50 prohibits the relay 51 from being activated and does not excite the electromagnetic coil L0 in order to maintain the two wheel drive state.

Steps S10 and S20 will now be discussed in detail.

Figure 4:
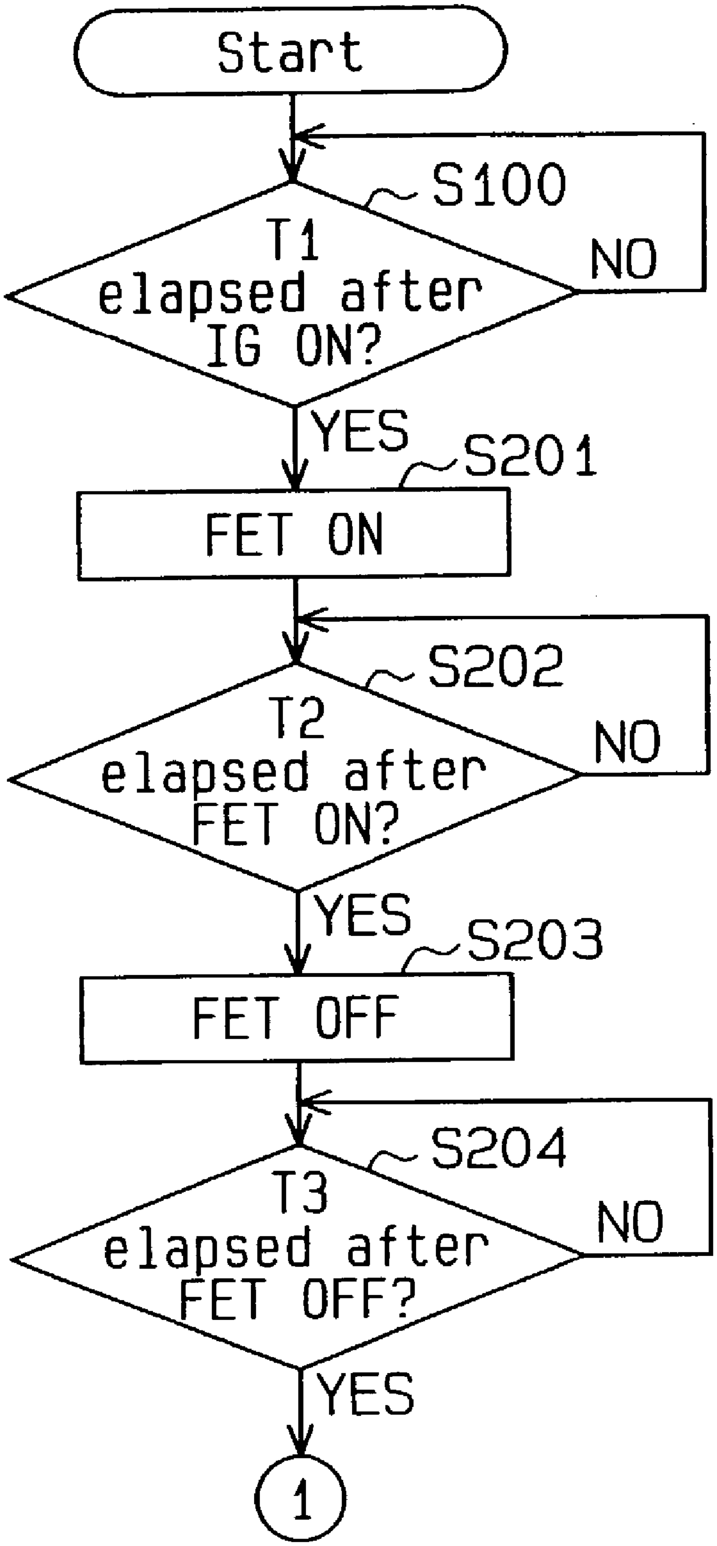
FIG. 4 is a flowchart illustrating the abnormality detection process performed by the controller of FIG. 2.
Figure 5:
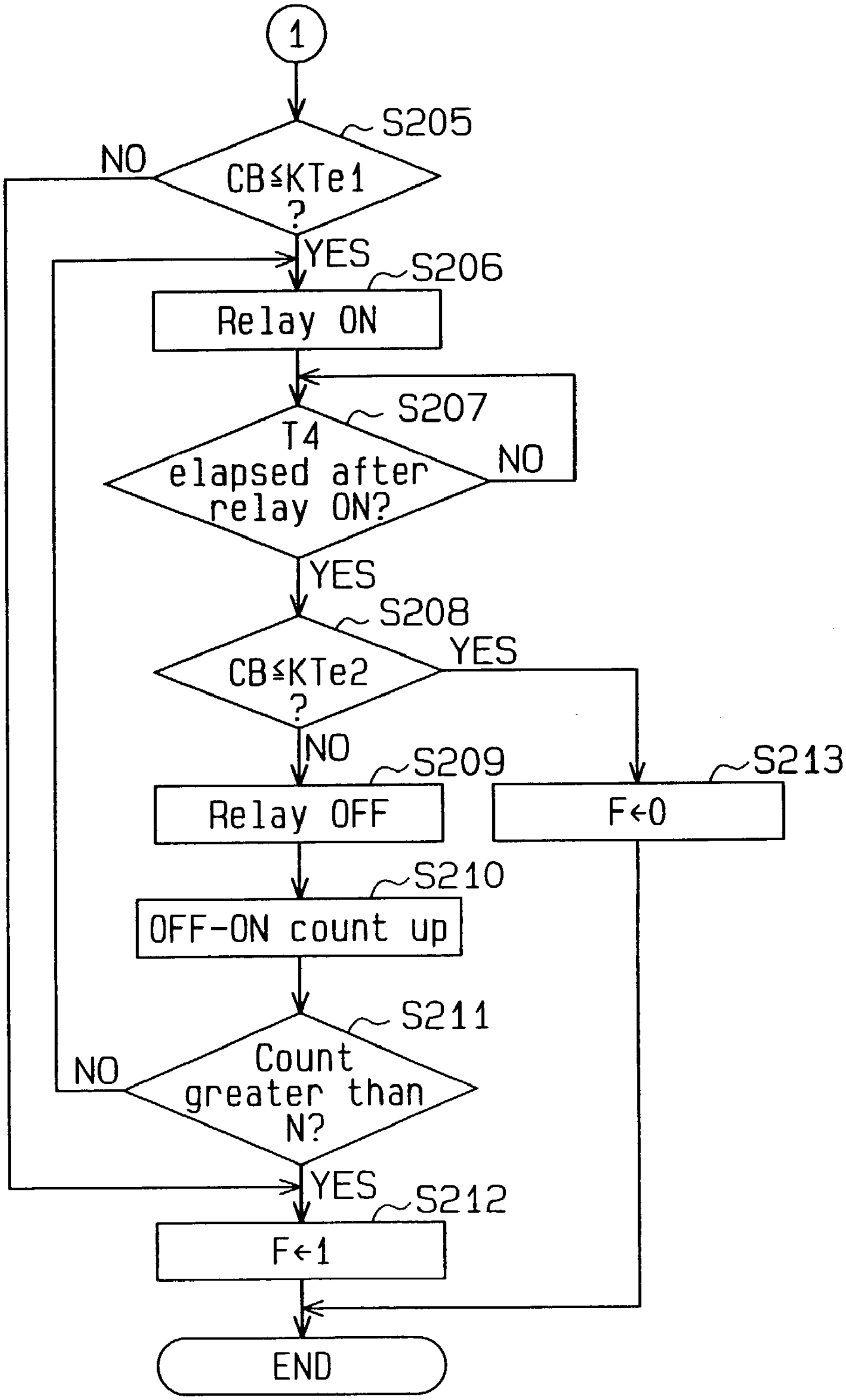
FIG. 5 is a flowchart illustrating the abnormality detection process performed by the controller of FIG. 2.

FIGS. 4 and 5 are flowcharts mainly illustrating the relay abnormality determination process routine of step S20. The flowchart of FIG. 4 also includes the process of step S10.

After the ignition switch IG goes on, the microcomputer 50 waits until a counter (not shown) counts up and a predetermined time T1 elapses (S100). The predetermined time T1 is the initial processing period of step S10.

When the microcomputer 50 recognizes that the predetermined time T1 has elapsed, the microcomputer 50 activates the transistor FET (S201).

After the transistor FET is activated, the microcomputer 50 counts up the counter (not shown) and waits until a predetermined time T2 elapses.

After the predetermined time T2 elapses, the microcomputer 50 deactivates the transistor FET (S203). The predetermined time T2 is the time that is sufficient for discharging the capacitor C (capacitor discharging time) of the noise elimination filter 52. That is, the predetermined time T2 is the time set for discharging the capacitor C when the ignition switch IG is off.

After the transistor FET is deactivated, the microcomputer 50 waits until the counter (not shown) counts up and a predetermined time T3 elapses (S204). More specifically, after the transistor FET goes off, a relay abnormality check counter of the microcomputer 50 is activated. The count value CB of the relay abnormality check counter is incremented when the power supply voltage VB is greater than or equal to a fusion threshold voltage VH (e.g. 9V). The fusion threshold voltage VH is preferably near the power supply voltage VB. The predetermined time T3 is a relay fusion check period. The relay fusion check period T3 is set at a time that is sufficient for the power supply voltage VB to increase from 0V and exceed the fusion threshold voltage VH when the relay is fused. The relay abnormality check counter is reset when the predetermined time T3 elapses and the process of the following step S205 ends.

After the predetermined time T3 elapses, the microcomputer 50 determines whether the count value CB of the relay abnormality check counter is less than or equal to the threshold value KTe1 (S205). When the count value CB is greater than the threshold value KTe1, the microcomputer 50 determines that the relay 51 has fused and jumps to step S212. That is, the microcomputer 50 determines that the relay 51 is fused when the power supply voltage VB remains greater than or equal to a fusion threshold voltage VH during the predetermined time T3 even though the relay has not been activated.

If the count value CB of the relay abnormality check counter is less than or equal to the threshold value KTe1, the microcomputer 50 determines that the relay 51 is not fused and proceeds to step S206.

At step S206, the microcomputer 50 activates the relay 51.

After the relay 51 is activated, the microcomputer 50 waits until a counter (not shown) counts up and a predetermined time T4 elapses (S207). More specifically, the relay abnormality check counter is activated after the relay 51 is activated. The count value CB of the relay abnormality check counter is incremented when the power supply voltage VB is less than or equal to an open abnormality check threshold voltage VL (e.g. 2 v). The open abnormality check threshold voltage VL is preferably near 0V. The predetermined time T4 is a relay open abnormality check period. The relay abnormality check counter is reset when the predetermined time T4 elapses and the process of the following step S208 ends.

After the predetermined time T4 elapses, the microcomputer 50 determines whether the count value CB of the relay abnormality check counter is greater than or equal to the threshold value KTe2 (S208). If the count value CB is less than or equal to the threshold value KTe2, the microcomputer 50 determines that there is no open abnormality and proceeds to step S213. That is, if the power supply voltage VB is greater than or equal to the open abnormality check threshold voltage VL during the predetermined time T4, the microcomputer 50 determines that there is no open abnormality. In other words, when the microcomputer 50 determines that the relay 51 is not fused and that there is no open abnormality, the microcomputer 50 proceeds to step S213.

If the count value CB is greater than the threshold value KTe2, the microcomputer 50 determines that there is a possibility of the relay 51 being in an opened state and proceeds to step S209.

At step S209, the microcomputer 50 deactivates the relay 51.

Then, when the relay 51 is de-activated, an OFF-ON counter K of the microcomputer 50 performs a count up operation (S210) More specifically, the OFF-ON counter K is a relay ON retry counter, which serves as an accumulative counter. That is, whenever the loop process of steps S206 to S211 is performed, the OFF-ON counter K performs the count up operation to accumulate the count value. For example, when the process of step S210 is performed for the first time after the relay 51 is activated and de-activated once, the OFF-ON counter performs the count up operation until reaching count value KT5. Then, when the process of step S210 is performed for the second time, the OFF-ON counter performs the count up operation starting from the count value KT5 until reaching count value KT6. When the process of step S210 is further performed for the third time, the OFF-ON counter performs the count up operation starting from the count value KT6 until reaching count value KT7.

In this manner, after the relay 51 is activated and deactivated once, the OFF-ON counter K counts the number of time for retrying the activation and de-activation of the relay 51. In the preferred embodiment, the retry number is set to two. That is, the count value KT5 of the relay ON retry counter indicates that the retry number is one, and the count value KT6 indicates that the retry number is two.

Then, the microcomputer 50 determines whether the count value of the OFF-ON counter K is greater than reference value N (in this case, two) in step S211. If the count value of the OFF-ON counter K is not greater that the reference value N, the microcomputer 50 jumps to step S206. If the count value of the OFF-ON counter H is greater than the reference value N, the microcomputer 50 proceeds to step S212.

In step S212, the microcomputer 50 sets the relay abnormality check flag to 1 in order to perform the fail safe process and then ends the routine.

In step S213, the microcomputer 50 sets the relay abnormality check flag to 0 in order to perform normal control processing.

(1) Case in which Relay is Functioning Normally

Figure 6:
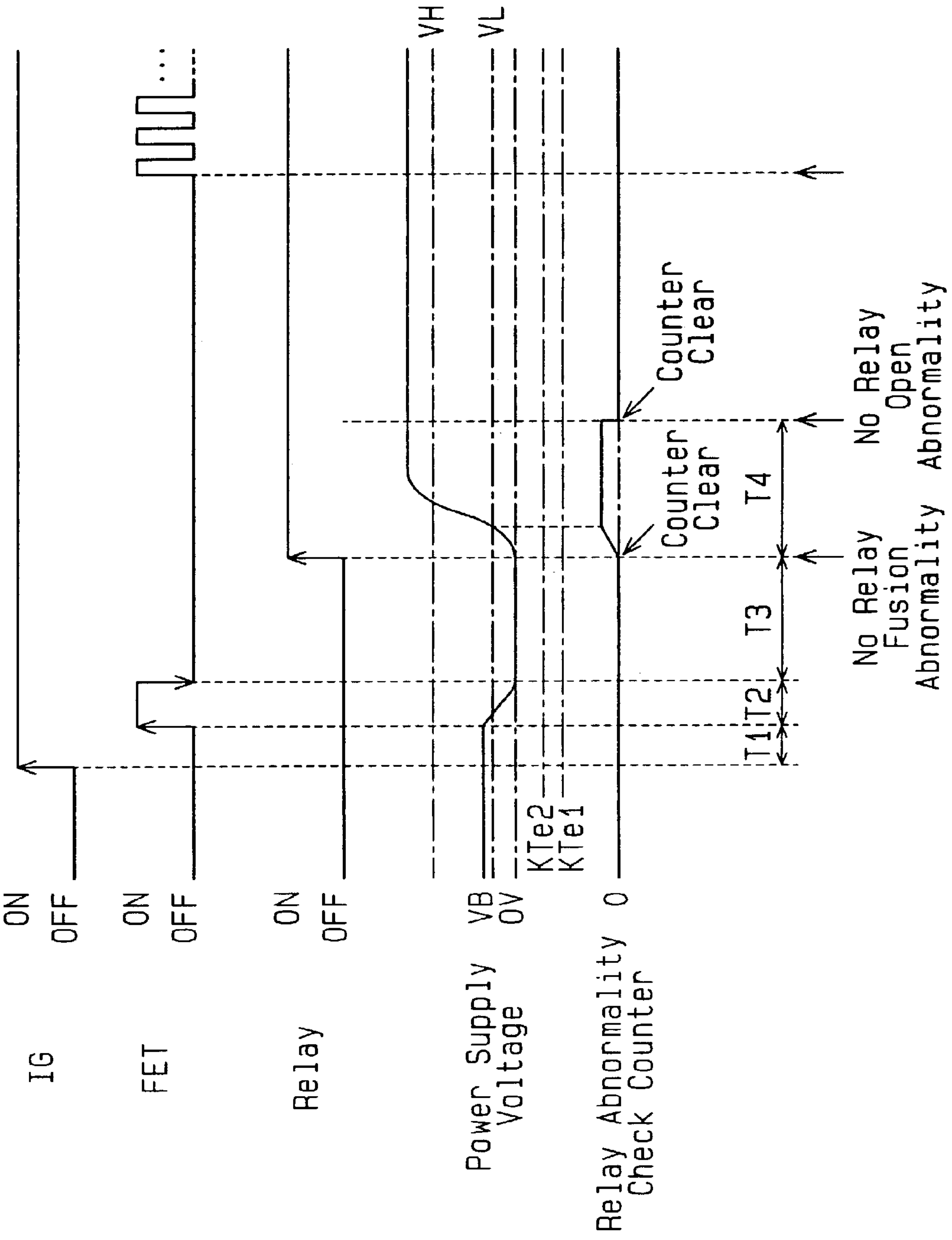
FIG. 6 is a time chart illustrating the operation of the controller of FIG. 2 when the relay is functioning normally.

A case in which the relay is functioning normally will now be discussed with reference to the time chart of FIG. 6.

When the ignition switch IG goes on, the power supply voltage VB is relatively low until the predetermined time T1 elapses due to the charges of the capacitor C (S10, S100). When the transistor FET is activated and deactivated once (S201, S203), the capacitor C is discharged and the power supply voltage VB decreases as the predetermined time T2 elapses.

After the predetermined time T3 elapses (S204), the microcomputer 50 determines that the count value CB of the relay abnormality check counter is less than or equal to the threshold value KTe1 (S205) and activates the relay 51 (S206).

After the relay 51 is activated and until the predetermined time T4 elapses, the power supply voltage VB is greater than or equal to the open abnormality check threshold voltage VL. Thus, the relay abnormality check counter stops the counting and the count value CB remains the same. Accordingly, the microcomputer 50 determines that an open abnormality has not occurred (S208), sets the relay abnormality flag to 0, and ends the routine (S213).

(2) Case in which the Relay is Fused

Figure 7:
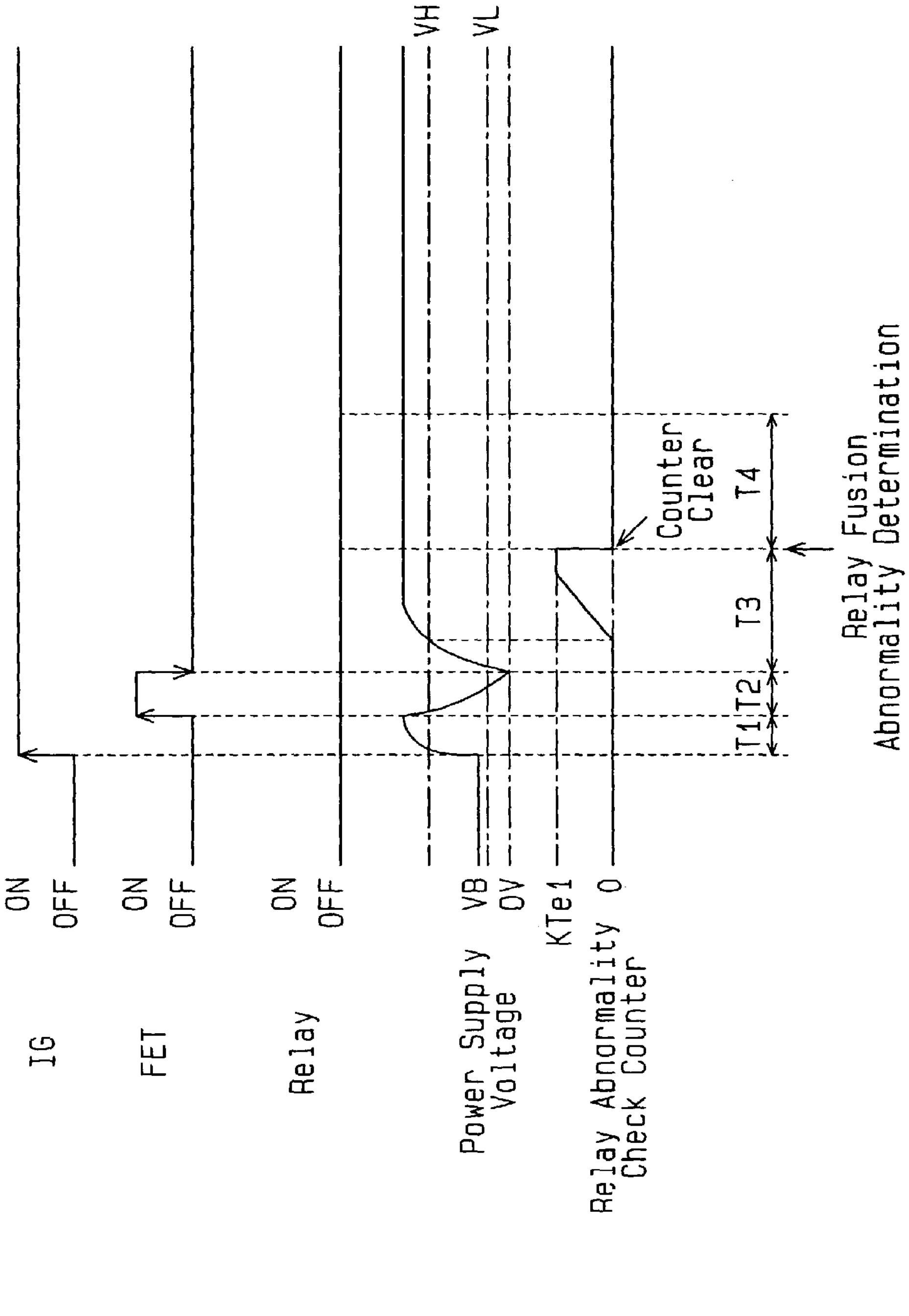
FIG. 7 is a time chart illustrating the operation of the controller of FIG. 2 when the relay is fused.

A case in which the relay is fused will now be discussed with reference to the time chart of FIG. 7.

When the ignition switch IG goes on, the power supply voltage VB increases until the predetermined time T1 elapses (S10, S100). When the transistor FET is activated and deactivated once (S201, S203), the power supply voltage VB decreases to 0V as the predetermined time T2 elapses. Then, after the transistor FET is deactivated, the power supply voltage VB increases before the predetermined time T3 elapses.

When the relay 51 is fused, the power supply voltage VB is greater than the fusion threshold voltage VH. Thus, the count value CB of the relay abnormality check counter is greater than or equal to the threshold value KTe1. Accordingly, the microcomputer 50 determines that the relay is fused, performs the fail safe process, sets the relay abnormality check flag to 1, and ends the routine.

(3) Case in which There is a Relay Open Abnormality

Figure 8:
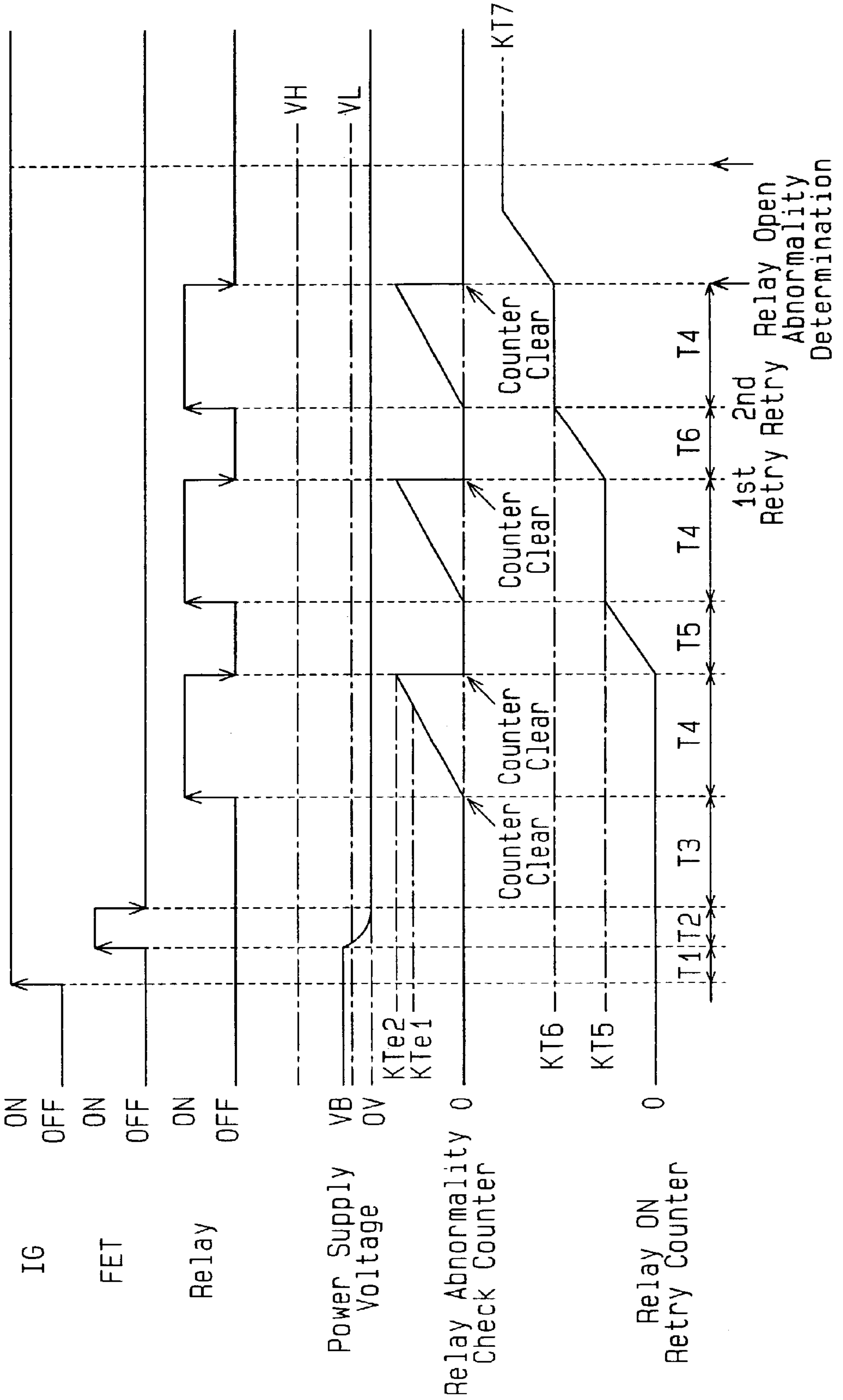
FIG. 8 is a time chart illustrating the operation of the controller of FIG. 2 when an open abnormality has occurred in the relay.

A case in which there is a relay open abnormality will now be discussed with reference to FIG. 8.

When the ignition switch IG goes on, the power supply voltage VB is relatively low until the predetermined time T1 elapses due to the charges of the capacitor C (S10, S100). When the transistor FET is activated and deactivated once (S201, S203), the capacitor C is discharged and the power supply voltage VB decreases.

After the predetermined time T3 elapses (S204), the power supply voltage VB is less than or equal to the fusion threshold value voltage VH. Thus, the count value CB of the relay abnormality check counter remains the same, and the count value CB does not exceed the threshold value KTE1. Accordingly, the microcomputer 50 determines that the relay 51 is not fused and activates the relay 51 (S206).

When the relay 51 has an open abnormality, after the relay 51 is activated, the power supply voltage VB does not increase even if the predetermined time T4 elapses, and the power supply voltage VB remains less than or equal to the open abnormality check threshold value VL. Thus, the count value CB of the relay abnormality check counter is incremented. When the count value CB exceeds the threshold value KTe2, the microcomputer 50 determines that an open abnormality may have occurred (S208) and deactivates the relay 51 (S209). As a result, the OFF-ON counter K performs the count up operation until reaching the count value KT5.

The microcomputer 50 performs a first check to determine whether the count value of the OFF-ON counter K is greater than the reference value N. Since the count value of the OFF-ON counter K is KT5, the microcomputer 50 activates the relay 51 again to perform a first retry.

If the relay open abnormality is continuous, the microcomputer 50 determines that an open abnormality may have occurred and deactivates the relay 51. Thus, the OFF-ON counter K performs the count up operation until reaching the count value KT6.

The microcomputer 50 determines that the count value KT6 of the OFF-ON counter K is not greater than the reference value N based on the second determination. Thus, the microcomputer 50 activates the relay 51 again to perform a second retry (S206).

If the relay open abnormality is continuous, the microcomputer 50 determines that an open abnormality may have occurred and deactivates the relay 51. Thus, the OFF-ON counter K performs the count up operation from the count value KT6.

The microcomputer 50 determines that the count value of the OFF-ON counter K is greater than the reference value N based on the third determination. Then, the microcomputer 50 determines that there is a relay open abnormality and sets the relay abnormality check flag to 1 (S212)

If the relay 51 recovers from the open abnormality state and returns to a normal state before the count value of the OFF-ON counter K reaches KT6, the power supply voltage VB increases and becomes greater than or equal to the open abnormality check threshold voltage VL, and the count value CB becomes less than or equal to the threshold value KTe1 (S208). Accordingly, the microcomputer 50 determines that an open abnormality has not occurred and sets the relay abnormality check flag to 0.

The drive force distribution controller 42 of the preferred embodiment has the advantages discussed below.

(1) The drive force distribution controller 42 intermittently repeats the activation and de-activation of the relay 51 for a number of times to detect the open abnormality of the relay 51. In this state, the microcomputer 50 determines whether an open abnormality has occurred based on the count value CB of the relay abnormality counter whenever repeating the activation and deactivation of the relay 51. Accordingly, after the relay 51 is repeatedly activated, the relay 51 is determined as not being abnormal if the power supply voltage VB is greater than or equal to the open abnormality check threshold voltage VL. As a result, if the contact failure of the relay 51 that occurs during the first check is incidental and the relay 51 returns to normal during the second check, the relay 51 is not erroneously detected as being abnormal.

Further, when the retry number for activating the relay exceeds two and the power supply voltage VB is less than the open abnormality check threshold voltage VL, the microcomputer 50 determines that the relay 51 is abnormal. Accordingly, when a continuous contact failure of the relay 51 occurs, the relay 51 is detected as being abnormal.

(2) The drive force distribution controller 42 determines that the relay 51 is abnormal whenever the ignition switch IG goes on. Thus, the abnormality detection is highly reliable.

(3) The microcomputer 50 determines whether the relay 51 is abnormal if the power supply voltage is greater than the fusion threshold voltage VH when the relay 51 is deactivated before checking for an open abnormality. Accordingly, fusion of the relay 51 is also detected.

(4) The microcomputer 50 activates the transistor FET and discharges the capacitor C before determining abnormality of the relay 51. Since the capacitor C is discharged before determining abnormality of the relay 51, erroneous detection caused by the charges of the capacitor C is prevented during the relay abnormality detection.

It should be apparent to those skilled in the art that the present invention may be embodied in many other specific forms without departing from the spirit or scope of the invention. Particularly, it should be understood that the present invention may be embodied in the following forms.

Instead of determining whether the retry number is greater than the predetermined reference value N, the microcomputer 50 may determine whether the number of all the activations and deactivations of the relay 51 including the first activation and deactivation is greater than a predetermined number.

In addition to the drive force distribution controller of the drive force transmission 17, which is installed in a front wheel drive base four wheel drive vehicle, the present invention may be applied to other devices that control a relay. For example, the present invention may be embodied in a drive force distribution controller of a drive force transmission installed in a rear wheel drive (FR) base four wheel drive vehicle. Alternatively, the present invention may be embodied in a drive force distribution controller of a drive force transmission installed in a RR base four wheel drive vehicle.

Instead of detecting the power supply voltage VB at node N3 between the relay 51 and the coil L, the voltage of one terminal of the electromagnetic coil L0 may be detected.

The present examples and embodiments are to be considered as illustrative and not restrictive, and the invention is not to be limited to the details given herein, but may be modified within the scope and equivalence of the appended claims.

What is claimed is:

1. An apparatus for detecting whether an open abnormality has occurred in a relay when the relay is activated, the apparatus comprising: a detection unit for repeatedly activating the relay for a number of times, determining whether an output voltage of the relay is less than a first threshold value, wherein the detection unit detects that an open abnormality has occurred in the relay when repeatedly determining that the output voltage is less than the first threshold value.

2. The apparatus according to claim 1, wherein the first threshold value is near 0V.

3. The apparatus according to claim 1, wherein the detection unit is connected to a power supply via a power supply switch and determines whether the output voltage of the relay is less than the first threshold value when the power supply switch is activated and the detection unit is supplied with power supply voltage.

4. The apparatus according to claim 1, wherein, before the relay is activated for the first time and when the relay is deactivated, the detection unit detects whether the output voltage is greater than a second threshold voltage and determines that the relay is abnormal when the output voltage is greater than the second threshold value.

5. The apparatus according to claim 4, wherein the first threshold value is near 0V, and the second threshold value is near the power supply voltage.

6. The apparatus according to claim 1, wherein the relay is connected between a power supply and an electromagnetic coil of a drive force transmission of a four wheel drive vehicle.

7. The apparatus according to claim 6, wherein the relay is connected to a series-connected circuit including a noise elimination filter, an electromagnetic coil, and a switching device, and the detection unit receives the voltage at a node between the noise elimination filter and the relay as the output voltage of the relay.

8. An apparatus for detecting whether an open abnormality has occurred in a relay when the relay is activated, the apparatus comprising: a detection unit for activating the relay and determining whether an output voltage of the relay is less than a first threshold value, wherein the detection unit repeats the activation of the relay and the determination when the output voltage is less than the first threshold value, and wherein the detection unit detects that an open abnormality has occurred in the relay when the number of repetition times exceeds a predetermined number.

9. The apparatus according to claim 8, wherein the predetermined number is two.

10. The apparatus according to claim 8, wherein the detection unit starts a counting operation after the relay is activated, increments a count value when the output voltage is less than the first threshold value, and determines that there may be an open abnormality when the incremented value exceeds a predetermined value.

11. The apparatus according to claim 10, wherein the detection unit increments the count value during a predetermined open abnormality check period.

12. The apparatus according to claim 8, wherein, before the relay is activated for the first time and when the relay is deactivated, the detection unit detects whether the output voltage is greater than a second threshold voltage and determines that a fusion abnormality has occurred in the relay when the output voltage is greater than the second threshold value.

13. The apparatus according to claim 12, wherein the first threshold value is near 0V, and the second threshold value is near the power supply voltage.

14. The apparatus according to claim 12, wherein the detection unit starts a counting operation after the relay is deactivated, increments a count value when the output voltage is greater than the second threshold value, and determines that a fusion abnormality has occurred in the relay when the incremented value exceeds a predetermined value.

15. The apparatus according to claim 14, wherein the detection unit increments the count value during a predetermined relay fusion check period.

16. The apparatus for detecting whether an open abnormality has occurred in a relay when the relay is activated, an apparatus comprising:

means for repeatedly activating the relay for a number of times, means for determining whether an output voltage of the relay is less than a first threshold value, and means for determining that an open abnormality has occurred in the relay when the means for determining repeatedly determines that the output voltage is less than the first threshold value.

* * * * *